March 12, 1968   R. K. STRONG   3,373,435
RECORDER WITH FLEXIBLE LOOP SUPPORT FOR INK SUPPLY TUBING
Filed Jan. 30, 1967   4 Sheets-Sheet 2

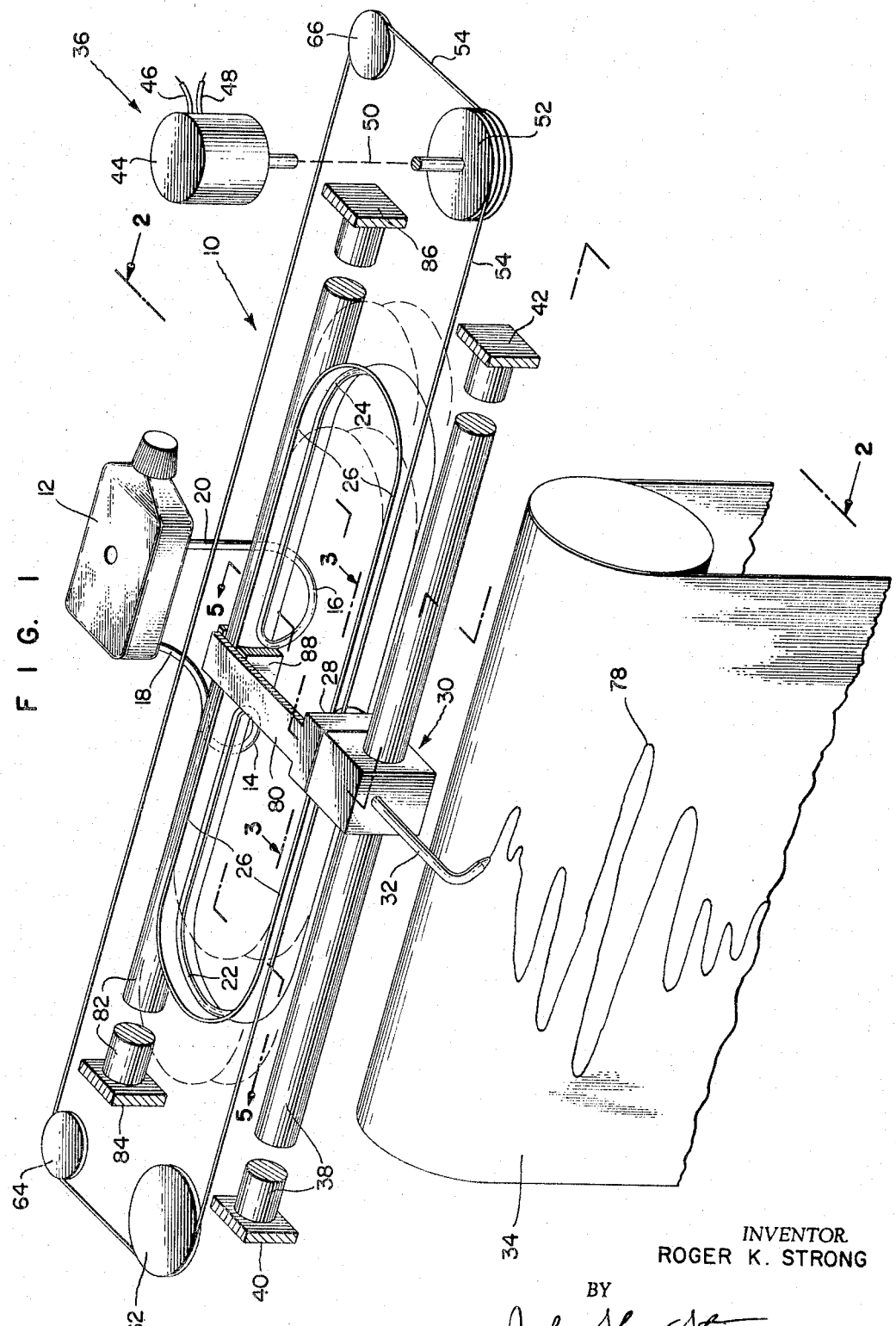
INVENTOR.
ROGER K. STRONG
BY
John Shaw Stevenson
AGENT.

INVENTOR.
ROGER K. STRONG
BY
John Shaw Stevenson
AGENT.

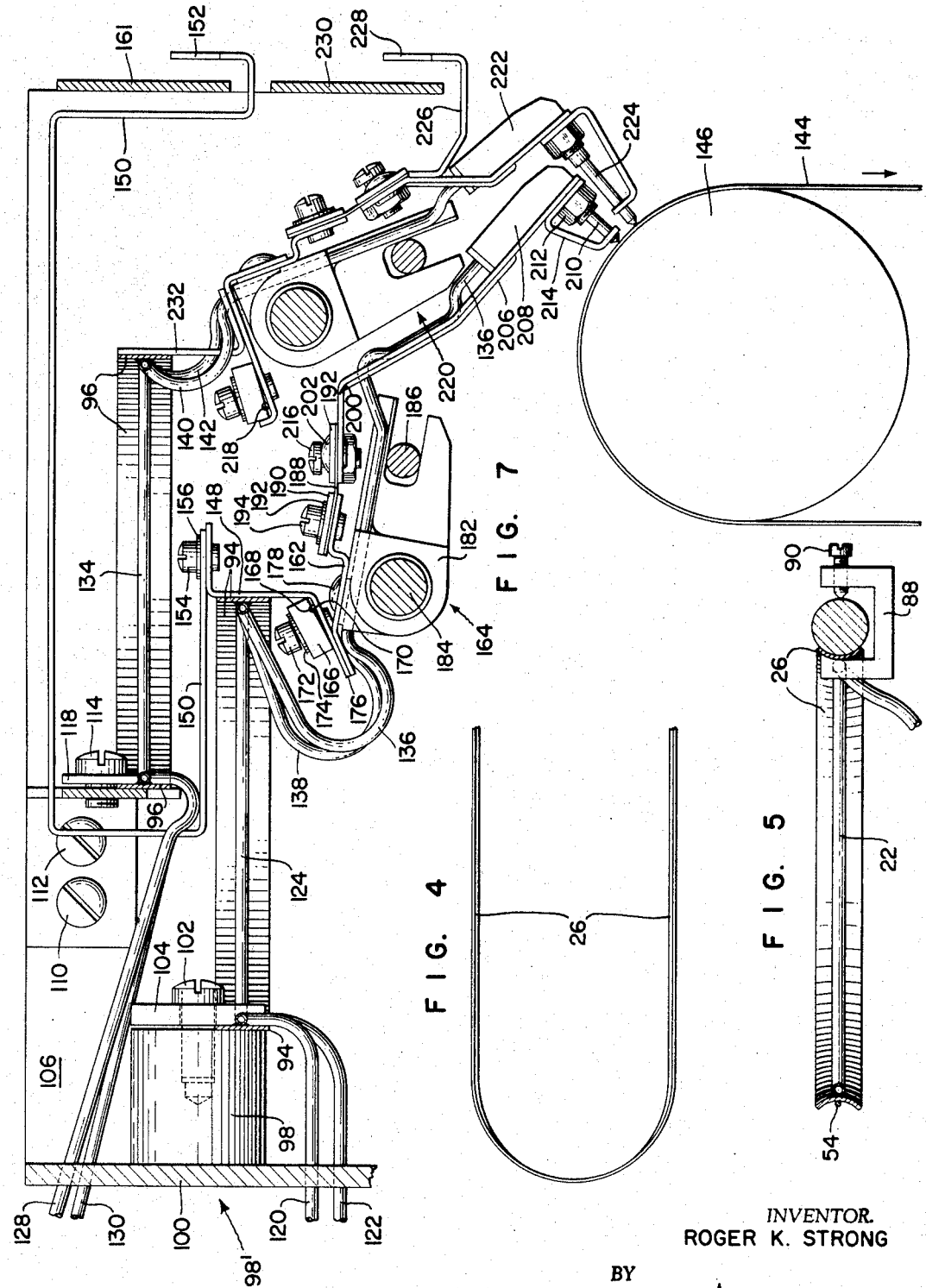

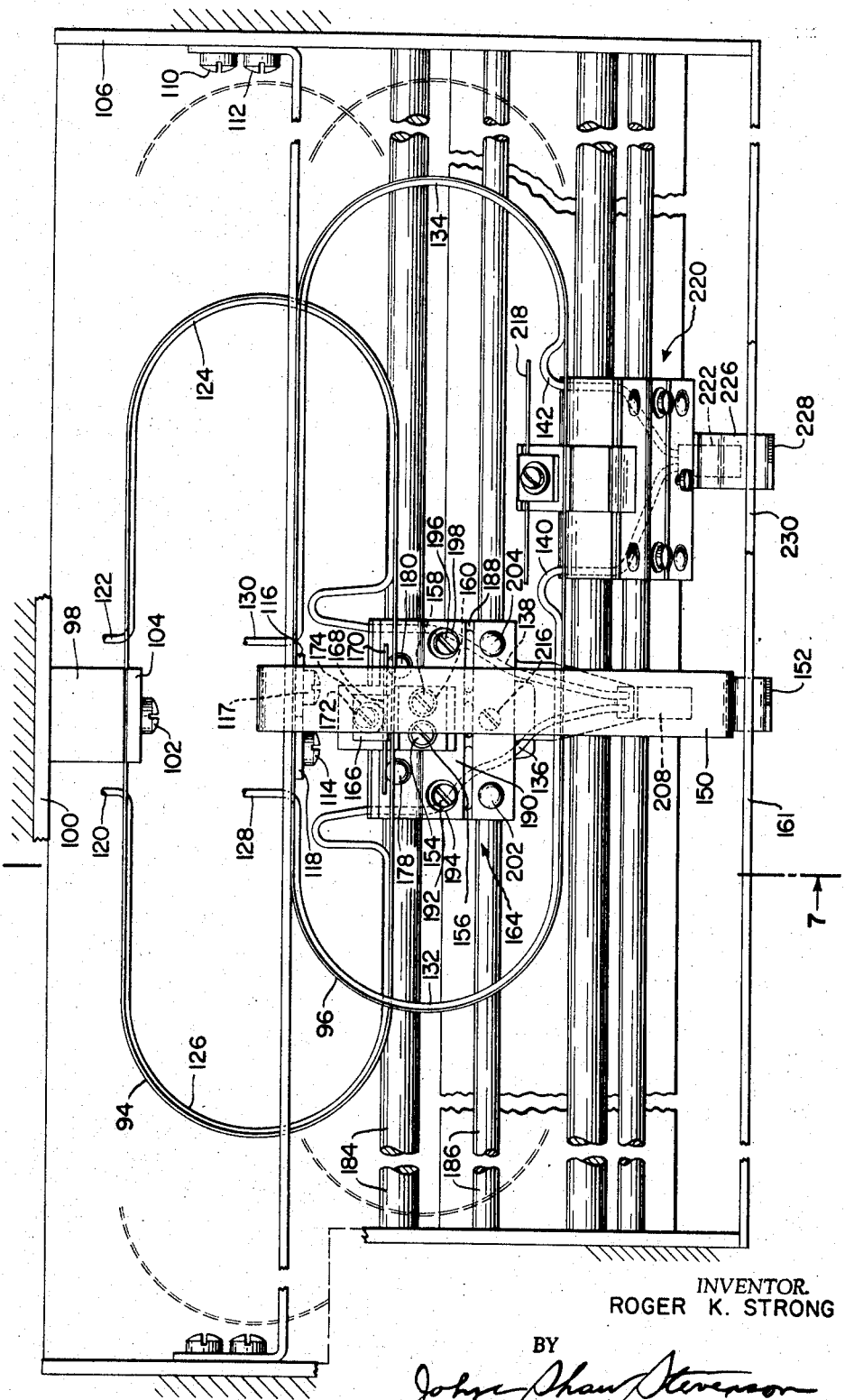

United States Patent Office 3,373,435
Patented Mar. 12, 1968

3,373,435
RECORDER WITH FLEXIBLE LOOP SUPPORT FOR INK SUPPLY TUBING
Roger K. Strong, Doylestown, Pa., assignor to Honeywell Inc., Minneapolis, Minn., a corporation of Delaware
Filed Jan. 30, 1967, Ser. No. 612,725
10 Claims. (Cl. 346—140)

ABSTRACT OF THE DISCLOSURE

A high speed recording apparatus for inscribing a continuous solid line on a chart containing a unitary elongated loop of flexible material and a loop of capillary tubing operably connected therewith for joint rolling movement about a fixed portion of the flexible loop by the movement of a carriage that is fixedly connected thereto to effect a feeding of ink from a stationary ink supply through the capillary tubing to and through a reservoir having a flexible wall and/or the tip of a pen mounted on the carriage as this carriage-pen unit is moved at recording speeds up to and/or exceeding four hundred inches per second along and in contact with the chart.

---

It is one of the objects of the present invention to disclose a loop of flexible material which not only acts as a guiding member for the aforementioned capillary tubing, but also acts to maintain the distance between the stationary and movable ends of the capillary tubing at a fixed value while the ink reservoir and tip of the pen is moved across a chart by the pen carriage.

It is a further object of the present invention to provide a flexible loop-shaped structure of the aforementioned type for bonding the outer surface of a capillary loop thereto so that the capillary loop can be moved back and forth across a chart by the motion of a pen carriage without introducing any kinks into the capillary and thereby avoid the adverse effect on the flow of ink to the pen which has heretofore been experienced by other different types of pen feeding mechanisms particularly when they are operated at the aforementioned abnormally high speeds.

It is a more specific object of the present invention to disclose a first loop of resilient material and a second loop formed by two flexible capillary tubes fixedly attached to the first loop to enable ink to flow from an ink source through these capillary tubes, a carriage mounted ink reservoir, and through a pen onto a paper chart to make a clear continuous record of changes which occur, for example, in the magnitude of a variable under measurement, as these loops are jointly moved at abnormally high rates of speed in a traversing manner back and forth across a chart and while traveling to the right and left side portion of a stationary portion of these loops.

It is still another object of the invention to disclose a capillary which is purposely made of an elongated loop-shaped configuration and whose portions, near its opposite ends, are rolled into curved end portions of this loop as this capillary is moved toward the right and thence toward the left ends of a chart by a similarly shaped flexible member to which this capillary is attached so that inertial forces introduced into the ink by this motion will force the ink out of the capillary into a carriage supported ink reservoir and/or through a pen to which the loops are attached.

It is another object of the present invention to disclose a modified form of the aforementioned recording apparatus in which only one of the aforementioned capillary tubes are employed with the previously referred to flexible loop to carry ink from a stationary ink supply to and through a pen to a chart to inscribe a continuous record thereon.

A better understanding of the present invention may be had from the following detailed description when read in connection with the accompanying drawing in which:

FIG. 1 shows an isometric view of a preferred form of the invention in which a flexible loop and capillary having two curved end portions are employed;

FIG. 4 is a plan view of the flexible members shown in FIG. 2;

FIG. 5 is an end view showing how a clamp is employed to attach the flexible member shown in FIG. 3 to a stationary member;

FIG. 6 is a plan view showing another modified form of the present invention; and FIG. 7 is a sectional view taken along the lines 7—7 of FIG. 6.

Figure 2:
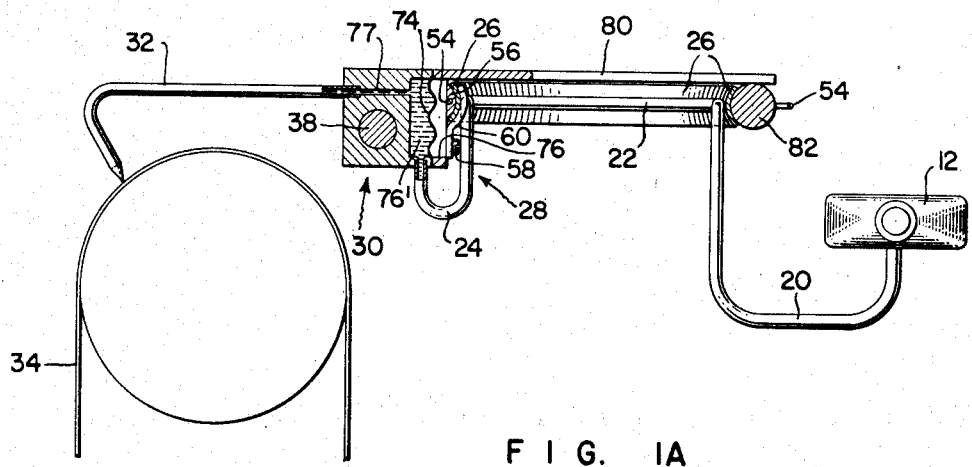
FIG. 2 is a view taken along section line 2—2 of FIG. 1.

The recorder 10, shown in FIG. 1, is comprised of a stationary container 12 for retaining an ink supply therein, a flexible capillary tubing 14, 16 connected at their ends 18, 20 to transmit ink in this container 12 through their respective central portions 22, 24, that are fixedly connected to a flexible loop-shaped member 26, and thence through an ink reservoir 28, mounted on a carriage 30, and through a pen 32 onto a chart 34.

A driving mechanism 36 employed to move the carriage 30 and pen 32 in slidable engagement at a varying speed along a shaft 38, that is fixedly attached at opposite ends to two stationary members 40, 42, can employ any one of a number of well known commercially available servo drives. The pen-carriage driving mechanism 36, shown by way of example in FIG. 1, is comprised of a reversible servo 44 having a pair of electrical leads 46, 48 for transmitting an incoming electric control signal to the motor from a remote location. The change in the magnitude of the varying electrical signal will determine the amount of rotation that the shaft 50 will transmit to a cable drum 52 that is fixedly attached thereto.

A continuous loop of wire 54 is shown in FIG. 1 wrapped about the drum 52 and having its ends movable therewith. FIG. 2 shows that the remaining portion of the wire 54 between its ends is fixedly connected by means of an oval-shaped block 56 and a screw 58 and a curved-shaped clamping plate 60 to the carriage 30. This will allow the cable being let off the drum 52 that is in contact with the guide pulleys 62, 64, 66 due to a change occurring in the magnitude of the electrical signal being fed into the motor 44, to move the carriage 30 and its associated pen 32 across the chart 34 in a right to left, or left to right direction.

Figure 3:
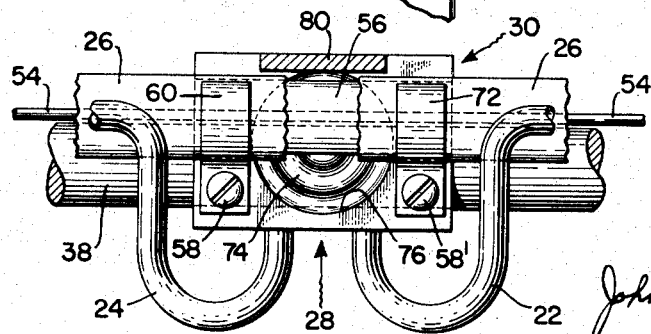
FIG. 3 is a rear elevation view of a clamp for retaining a portion of the flexible loop shown in FIG. 1A in a fixed position on the pen carriage.

The loop member 26 is made of a single flexible material that is of a bowed-shaped cross section, and flexed in the form of the loop shown in FIG. 1. The portion of the loop member 26 adjacent the carriage 30, shown in FIGS. 2 and 3, is held in fixed relation with the carriage 30 by tightening the screws 58 on the carriage 30 so that the previously mentioned block 56 and the clamping plate 60, 72 will be forced into nonmovable relationship with this portion of the loop member 26.

The ink reservoir 28, forming a portion of the carriage 30, contains a flexible diaphragm 74. One side of the diaphragm 74 is in contact with ink 76′ transmitted to the reservoir 28 by way of the capillary 18, 22; 20, 24, and the other side of the diaphragm 74 is exposed to atmospheric pressure by way of the passageway 76 in the carriage 30. Further details of the type of reservoir disclosed herein are disclosed in the Roger K. Strong patent application Ser. No. 448,702, filed Apr. 16, 1965, now abandoned.

The ink 76, in the ink reservoir 28, passes through the passageway 77 in the carriage and thence to the pen 32 onto the chart 34 to draw a record line 78 thereon.

A rectangular plate 80 which is integral with, and which extends in a cantilever fashion from the carriage 30 in spaced apart fashion over the top edge of the loop member which is used to maintain good contact between the pen 32 and the chart 34 as the carriage 30 is moved.

A part of the rear portion of the flexible loop 26 is shown clamped in a fixed position on the central portion of a stationary guide rod 82 that extends between two stationary plates 84, 86 by means of a U-shaped plate 88 and a screw 90 threadedly mounted thereon as is shown in FIG. 5.

The free rear portion of the flexible loop 26, shown in FIG. 1, is constructed to roll along the stationary guide rod 82 to the left and to the right of its solid line position to its respective dash line position, shown in FIG. 3, when the carriage 30 is moved to the right and left of the solid line position shown in this figure.

This back and forth motion of the flexible loop 26 causes the ink 76 in the front left and right straight portions of the capillary adjacent the carriage 30 to acquire an inertial force which will alternately force the ink out of the capillary into the ink reservoir 28 and cause the ink 76 in the reservoir 28 to flow out through the pen onto the chart 34.

The level of the ink 76 in the ink supply chamber is shown located at a position near and below the level of the tip of the pen 32 to which the ink 76 is applied to the chart 34 so that the ink 76 from the ink supply 12 will flow by capillary action, through the capillary tubes 18, 20; 22, 24 to the pen, particularly when the pen is maintained in a fixed position while it is placing a record on the chart 34.

Figure 1A:
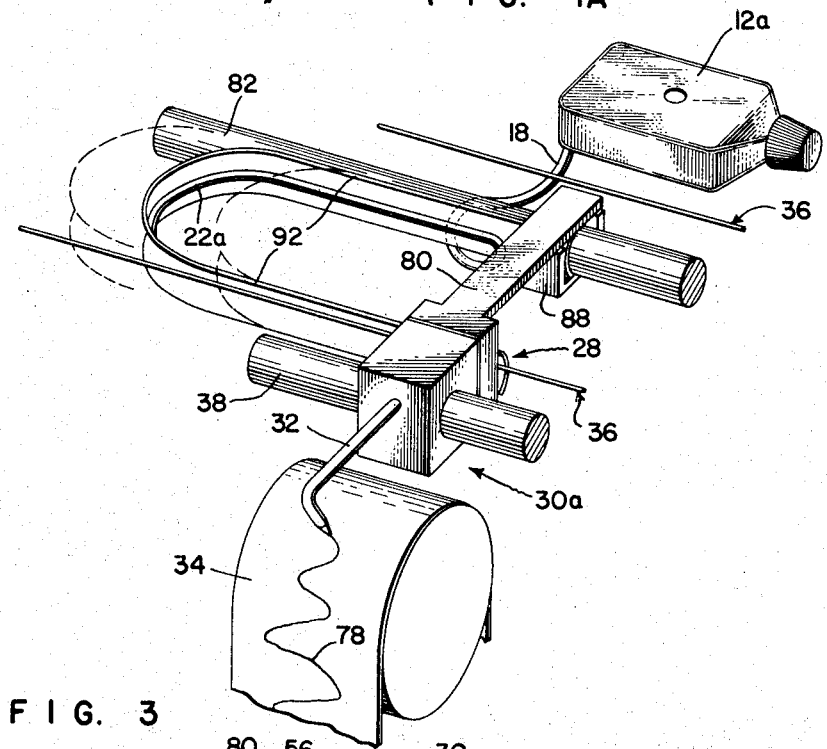
FIG. 1A is an isometric view of a modified form of the invention in which a flexible loop, and capillary having a single curved end portion, is employed.

FIG. 1A shows a single curved flexible loop 92 which can be substituted for the double curved flexible loop 26, shown in FIG. 1.

FIG. 1A utilizes the same type of pen driving mechanism 36 as that which has been previously set forth under the description of FIG. 1.

Since only one of the capillaries 18, of FIG. 1, are required in the construction shown in FIG. 1A, the ink supply chamber 12 and ink reservoir 28, shown in FIG. 1A, will therefore require only a single one of the two connections that were required with the double capillary construction shown in FIG. 1. The single curved flexible loop 92, of FIG. 1A is constructed to move from its solid line position back and forth between the dash line positions shown on either side of its solid line position when the driving mechanism 36 moves the carriage 30a and the pen 32 back and forth between the ends of the chart 34.

During the aforementioned back and forth motion of the carriage 30a, ink will be forced to flow from the ink supply chamber 12a through the capillary 18, 22a which is fixedly attached to the flexible member 92, through the ink reservoir 28, the pen 32 onto the chart 34 by the inertial force introduced into the ink in the straight front sections of the flexible loop by the joint movement of the capillary 18, 22a with the flexible member 92 and the carriage 30a.

FIGS. 6 and 7 show how two flexible loops 94, 96, which are of a rectangular cross section, can be employed in lieu of the previously described single flexible loop 26 which is of an arcuate cross section. The first of these flexible loops 96, shown in FIGS. 6 and 7, is connected to a block 98 that forms a fixed portion of a wall 100 of the recorder 98 by means of a screw member 102 and the plate connection 104.

As is best shown in FIG. 6, the other flexible loop 96 is connected to another wall 106 of the recorder by means of an angle plate 108 containing two screws 110, 112 connecting it to the wall 106 and a two screw flexible loop plate connection 114, 116; 117, 118.

The ends 120, 122 of a pair of capillaries 124, 126 and the ends 28, 130 of the capillaries 132, 134, shown in FIGS. 6 and 7, are connected to an ink supply chamber in the same manner as that shown between the capillary 18, and 20 and its associated ink supply chamber 12.

The portions between the ends 120, 136; 122, 138; 128, 140; 130, 142, of each of these capillary tubes 124, 126; 132, 134 are bonded by any suitable material for movement with their associated flexible loops 94, 96 and for movement towards the right and left ends of the chart 144 and a chart guide roller 146 in the direction of the arrow shown in FIG. 7.

A substantially Z-shaped plate 148 is connected by a suitable material, e.g. solder to the outermost central portion of flexible loop 94.

A pointer arm 150 containing a pointer 152 on its outer end is also attached to the member 148 by means of screw and lock washer connections 154, 156; 158, 160 so that the pointer arm 150 and the pointer 152 will be moved across a scale 161 with the member 148 and the portion of the flexible loop 94 to which the member 149 is attached.

The lower portion of the member 148 is fixedly attached by solder to a substantially S-shaped plate 162 forming a part of this carriage 164.

A pad 166 having a grooved out portion 168 is positioned over the carriage drive cable 170 and is retained in a clamped, nonslipping engagement with this cable 170 by means of a screw 172 and lock washer connection 174 that extends between the pad 166 and a lower leg portion 176 of the Z-shaped member 148.

The S-shaped member 162 is fixedly connected by rivets 178, 180 to the slidable carriage 182 for movement therewith. The carriage 182 is constructed of a commercially available plastic Delrin that is, in turn, mounted as shown for slidable movement along the stationary shafts 184, 186.

The outer end of the S-shaped member 162 has a spring plate 188 mounted thereon by means of a rectangular pad 190 and associated screw and lock washer connections 192, 194; 196, 198. The other end of the spring plate 188 has the left inner end of a plate 200 fixedly mounted thereon by means of rivets 202, 204. The plate 200 is stiffened by welding another plate 206 to its bottom surface. The bottom surface of the plate 200 supports a pen 210, a nut 212, and a support arm 214.

Ink is delivered through the two capillaries 136, 138 to the ink reservoir 208 and thence through the pen 210 onto the chart 144 to make a record thereon as movements of the driving wire 168 is transmitted by way of the Z-shaped plate member 148 to the flexible loop 110 and by way of the S-shaped plate 178 and carriage 164 to move the flexible loop 194 and carriage 164, the reservoir 208 and the pen supporting plate 200 along the stationary shafts 184, 186.

The aforementioned pen arm actuated mechanism also is provided with a screw 216 to adjust the length of the stroke recorded on the chart when the roller 146 and the chart 144 thereon is moved in a downward and outward direction to the right of that shown in FIG. 7 when a change in chart paper is desired.

A second pen driving cable 218, driven by a separate drive mechanism (not shown), and similar to that shown in FIG. 1, is employed to move a carriage 220, a reservoir 222, and a pen 224 that are of substantially the same construction and function in the same manner as the parts associated with the first previously described drive cable 168, carriage 184, reservoir 208 and pen 210. A pointer arm 226 is also employed in this second pen driving mechanism which carries a pointer 228 at its right end in order to visually indicate on an indicating scale 230 changes in the chart position of the pen 224.

The right end portion of the flexible loop 96, shown in FIG. 7, is connected for joint movement with the carriage 220 by soldering one end of an L-shaped member 232 to this loop and another end of this L-shaped member 232 to the carriage 220.

The capillary tubes 140, 142 extend along the carriage and the parts associated therewith, as shown in FIG. 7, and are connected to supply ink through the resevoir 222, pens 210, 224 onto the chart 144.

The level of the ink in each of the ink supply chambers in FIGS. 6 and 7 from which ink is drawn into and through their respective reservoirs 208, 222 and associated pens 210, 224, by the inertial forces acting on the ink in the portions of the capillary that are located immediately to the left and right sides of each of the separate carriages 164, 220, is located at the same level as that described for the ink supply chamber 12.

The embodiments of the invention in which an exclusive property or privilege is claimed are defined as follows:

1. A recording apparatus to transmit a supply of ink from a chamber to and through a pen fixedly connected for movement with a carriage that is operably connected to move the pen across a chart, comprising a flexible member of a loop-shaped configuration, flexible ink filled capillary tubing having a central portion located between its ends extending along the flexible loop-shaped member, said tubing being fixedly connected for movement with the carriage and with the flexible loop-shaped member about a stationary portion of the flexible loop member and the capillary tubing having opposite end portions thereof connected respectively to the ink in the ink supply chamber and the pen.

2. The recording apparatus defined in claim 1, wherein the resilient ink filled capillary tubing is comprised by two separate tubes, one of said tubes having its central portion extending along one curved end of the flexible member and the other one of the tubes having its central portion extending along an opposite curved end of the flexible member.

3. The recording apparatus defined in claim 1 wherein the flexible member is of a U-shaped configuration, the resilient ink filled capillary tubing is comprised of a single tube having its central portion extending along the flexible member.

4. The recording apparatus defined in claim 1 wherein a second recording apparatus similar to the first recording apparatus is mounted adjacent the first recording apparatus to simultaneously transmit ink from an ink supply to the pen of the second recording apparatus that is connected for movement with another carriage that is operably connected to move the second pen across a chart adjacent the location on the chart where the first pen is moved across the chart.

5. The recording apparatus defined in claim 1 wherein an ink reservoir having a flexible wall is employed to form an ink storage chamber connection between the capillary tubing employed to carry ink to the pen and the pen per se.

6. The recording apparatus defined in claim 1 wherein the ink supply chamber is located at a position to maintain the level of the ink in the ink supply chamber near and below the level as the tip of the pen to which ink is being applied to the chart.

7. The recording apparatus defined in claim 1 wherein portions of the capillary tubing in contact with the flexible loop members adjacent opposite ends of the flexible loop are of a curved shaped configuration, and wherein said portions of the capillary loop adjacent each of these opposite ends of the flexible capillary loop continue to roll into said curved shaped construction as the carriage and flexible member moves the capillary tubing in directions toward and away from opposite ends of the chart to thereby introduce inertial force into the ink within the capillary tubing to force ink out of the capillary through the pen to the chart.

8. The recording apparatus as defined in claim 1 wherein a stationary guide member is positioned adjacent an elongated side portion of the flexible member to provide a surface along which the flexible member and the capillary attached to the flexible member can be rolled between opposite ends of the chart to introduce inertial force into the ink within the capillary tubing which will force the ink out of the capillary through the pen to the chart.

9. The recording apparatus defined in claim 1 wherein the resilient ink filled capillary tubing is comprised of a single tube having its central portion extending along the flexible member and wherein a portion of the tube adjacent its central portion continues to roll into said curved shaped construction as the carriage and the flexible member moves the single tube in a direction towards and away from the opposite ends of the chart to thereby introduce inertial force into the ink within the single tube which forces ink out of the capillary through the pen to the chart.

10. The recording apparatus defined in claim 1 wherein the flexible loop is comprised of a band of spring material whose cross section is of a concave shaped configuration.

References Cited

UNITED STATES PATENTS 3,299,436   1/1967   Behmoras et al. _____ 346—140

J. W. HARTARY, *Assistant Examiner.*

RICHARD B. WILKINSON, *Primary Examiner.*